United States Patent
Mattis et al.

[11] Patent Number: 6,113,167
[45] Date of Patent: Sep. 5, 2000

[54] PANEL MEMBER CARRIER SYSTEM

[76] Inventors: Herbert H. Mattis, 3650 Hackberry St., Bismarck, N. Dak. 58501; Timothy D. Mattis, 306 4th St. North, Breckenridge, Minn. 56520

[21] Appl. No.: 09/320,209

[22] Filed: May 26, 1999

[51] Int. Cl.[7] .................................................. B65G 7/12
[52] U.S. Cl. ............................................ 294/16; 294/104
[58] Field of Search ............................. 294/15–17, 19.1, 294/22, 27.1, 28, 31.1, 62, 101, 102.1, 103.1, 104, 113, 114, 116, 164

[56] References Cited

U.S. PATENT DOCUMENTS

| | | | |
|---|---|---|---|
| 747,376 | 12/1903 | Christman | 294/22 |
| 2,647,007 | 7/1953 | Gmoser et al. | 294/104 |
| 2,762,647 | 9/1956 | Guest | 294/22 |
| 2,776,856 | 1/1957 | Ingram | 294/16 |
| 3,146,015 | 8/1964 | Roberge | 294/104 X |
| 3,374,024 | 3/1968 | Reynolds | 294/16 |
| 3,519,305 | 7/1970 | Horstketter et al. | 294/104 X |
| 3,524,670 | 8/1970 | Ilich | 294/16 X |
| 4,013,202 | 3/1977 | Russo | 294/16 X |
| 4,417,361 | 11/1983 | Smith | 294/16 X |
| 5,685,585 | 11/1997 | Wulff | 294/16 |

*Primary Examiner*—Johnny D. Cherry
*Attorney, Agent, or Firm*—Michael S. Neustel

[57] ABSTRACT

A panel member carrier system for allowing a single person to easily transport one or more panel members. The inventive device includes a support member having a lower portion and an upper portion, an arm member adjustably attached to the upper portion, an engaging structure pivotally attached to the upper portion, and a lower handle pivotally attached to the lower portion and mechanically connected to the engaging structure by a connecting member. A piece of gripping is attached to the interior portion of the arm member facing the engaging structure for engaging the one or more panel members. The engaging structure includes a face plate, a brace attached to the face plate and a pair of pivot members pivotally attached between the brace and the upper portion. The connecting member is attached to the lower handle and the brace with a spring connected to the connecting member. The position of the arm member with respect to the engaging structure is controlled by an adjusting handle and threaded shaft that threadably engage the upper portion of the support member. An upper handle is preferably attached to the upper portion of the support member for allowing engagement by the user.

20 Claims, 4 Drawing Sheets

PANEL MEMBER CARRIER SYSTEM

BACKGROUND OF THE INVENTION

1. Field of the Invention

The present invention relates generally to panel member carrying devices and more specifically it relates to a panel member carrier system for allowing a single person to easily transport one or more panel members.

Construction workers often times have to transport one or more panel members such as sheet rock or plywood. These panel member generally are comprised of a length of eight feet and a width of four feet. Usually one or more workers are required to transport the panel members because of the awkwardness of carrying large panel members. This is time consuming and not practical for smaller operations. Hence, there is a need for a panel member carrier system that easily allows an individual to transport one or more panel members without undue burden.

2. Description of the Prior Art

Panel member carrying devices have been in use for years. Typically, conventional panel member carrying devices comprise a handle with a hook member attached thereto that is positionable underneath the bottom edge of the panel member. The user then must lift the panel member from a substantially low position.

The main problem with conventional panel member carrying devices is that the user must significantly lower their body to position the hook member below the bottom edge of the panel member thereby placing a significant strain upon the user's back. In addition, conventional panel member carrying devices do not adequately balance the panel members thereby causing significant problems for transporting the panel members upon inclines and declines such as stairways. An additional problem is that conventional panel member carrying devices allow only one place to grip thereby requiring the user to utilize their free hand to retain the balance of the panel member.

Examples of conventional panel member carrying devices include U.S. Pat. 4,982,987 to Riggins et al.; U.S. Pat. No. 5,397,158 to Brass et al.; U.S. Pat. 5,540,471 to Whitney; U.S. Pat. No. 4,695,085 to Cassels; U.S. Pat. No. 4,113,160 to Spiers which are all illustrative of such prior art.

Riggins et al. (U.S. Pat. No. 4,982,987) discloses a masonry block tool for picking up, transporting and laying webbed masonry blocks. Riggins et al teaches a handle member, a pair of cross handle members, a tongue member, and an end blade member.

Brass et al. (U.S. Pat. No. 5,397,158) discloses a wallboard carrier for readily lifting and carrying wallboard. Brass et al teaches a supporting platform and a pair of shanks extending from the platform leading to a horizontal handle.

Whitney (U.S. Pat. No. 5,540,471) discloses a hand tool for handling sheet material. Whitney teaches an elongated body having a handle portion, a shank portion and a foot portion.

Cassels (U.S. Pat. No. 4,695,085) discloses a sheet carrier. Cassels teaches a pair of plate components pivotally attached to one another with the lower plate having a foot portion for engaging a sheet member.

While these devices may be suitable for the particular purpose to which they address, they are not as suitable for allowing a single person to easily transport one or more panel members. Conventional panel member carrying devices provide inadequate balancing of the panel members. In addition, conventional panel member carrying devices are not as suitable for engaging one or more panel members.

In these respects, the panel member carrier system according to the present invention substantially departs from the conventional concepts and designs of the prior art, and in so doing provides an apparatus primarily developed for the purpose of allowing a single person to easily transport one or more panel members.

SUMMARY OF THE INVENTION

In view of the foregoing disadvantages inherent in the known types of panel member carrying devices now present in the prior art, the present invention provides a new panel member carrier system construction wherein the same can be utilized for allowing a single person to easily transport one or more panel members.

The general purpose of the present invention, which will be described subsequently in greater detail, is to provide a new panel member carrier system that has many of the advantages of the panel member carrying devices mentioned heretofore and many novel features that result in a new panel member carrier system which is not anticipated, rendered obvious, suggested, or even implied by any of the prior art panel member carrying devices, either alone or in any combination thereof.

To attain this, the present invention generally comprises a support member having a lower portion and an upper portion, an arm member adjustably attached to the upper portion, an engaging structure pivotally attached to the upper portion, and a lower handle pivotally attached to the lower portion and mechanically connected to the engaging structure by a connecting member. A piece of gripping is attached to the interior portion of the arm member facing the engaging structure for engaging the one or more panel members. The engaging structure includes a face plate, a brace attached to the face plate and a pair of pivot members pivotally attached between the brace and the upper portion. The connecting member is attached to the lower handle and the brace with a spring connected to the connecting member. The position of the arm member with respect to the engaging structure is controlled by an adjusting handle and threaded shaft that threadably engage the upper portion of the support member. An upper handle is preferably attached to the upper portion of the support member for allowing engagement by the user.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a panel member carrier system that will overcome the shortcomings of the prior art devices.

Another object is to provide a panel member carrier system that allows a user to easily transport one or more panel members.

An additional object is to provide a panel member carrier system that is adjustable for engaging one or more panel members.

A further object is to provide a panel member carrier system that automatically balances the panel members to be transported.

Another object is to provide a panel member carrier system that allows the user to easily transport panel member upon inclined or declined surfaces.

A further object is to provide a panel member carrier system that does not require the user to significantly reach downwardly to engage the panel members.

Another object is to provide a panel member carrier system that does not require significant physical exertion by the user.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
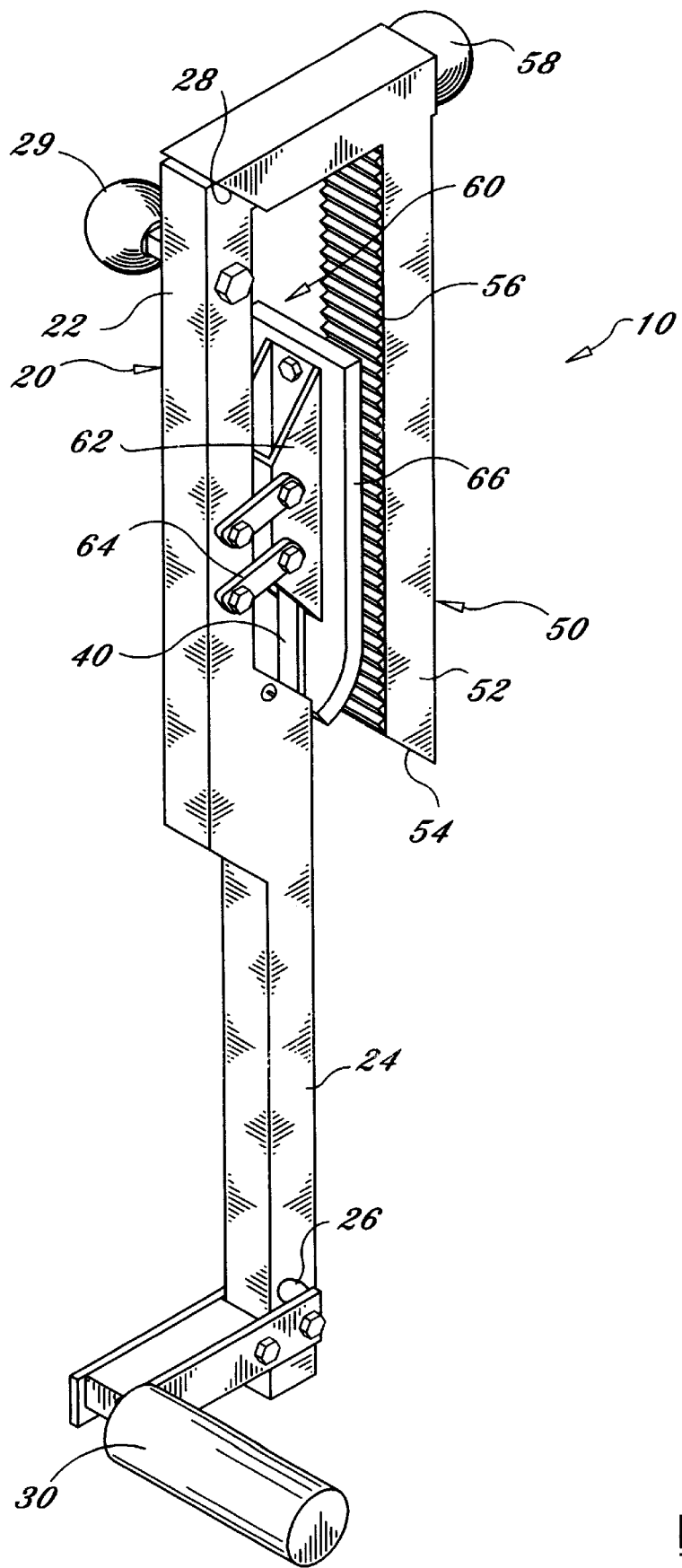
FIG. 1 is an upper perspective view of the present invention.

Turning now descriptively to the drawings, in which similar reference characters denote similar elements throughout the several views, FIGS. 1 through 4 illustrate a panel member carrier system 10, which comprises a support member 20 having a lower portion 24 and an upper portion 22, an arm member 50 adjustably attached to the upper portion 22, an engaging structure 60 pivotally attached to the upper portion 22, and a lower handle 30 pivotally attached to the lower portion 24 and mechanically connected to the engaging structure 60 by a connecting member 40. A piece of gripping 56 is attached to the interior portion of the arm member 50 facing the engaging structure 60 for engaging the one or more panel members 12. The engaging structure 60 includes a face plate 66, a brace 62 attached to the face plate 66 and a pair of pivot members 64 pivotally attached between the brace 62 and the upper portion 22. The connecting member 40 is attached to the lower handle 30 and the brace 62 with a spring 42 connected to the connecting member 40. The position of the arm member 50 with respect to the engaging structure 60 is controlled by an adjusting handle 58 and threaded shaft 59 that threadably engage the upper portion 22 of the support member 20. An upper handle 29 is preferably attached to the upper portion 22 of the support member 20 for allowing engagement by the user.

Figure 2:
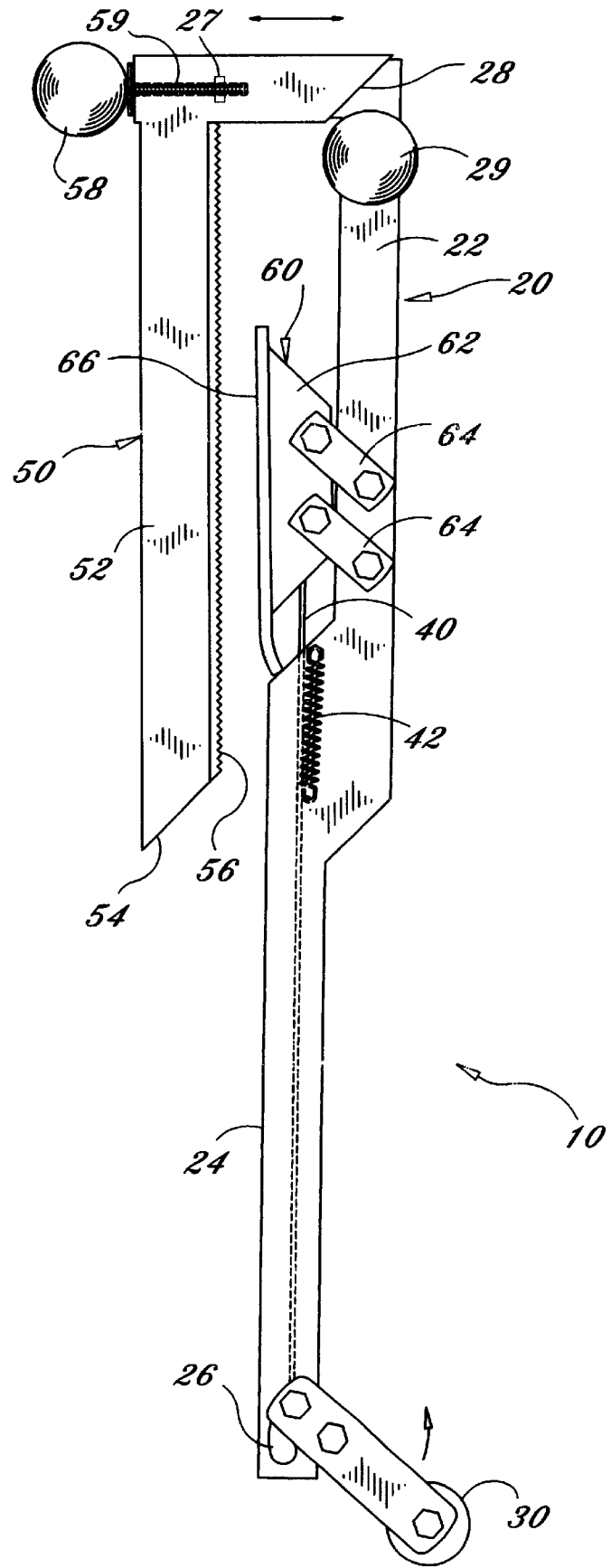
FIG. 2 is a side view of the present invention.
Figure 3:
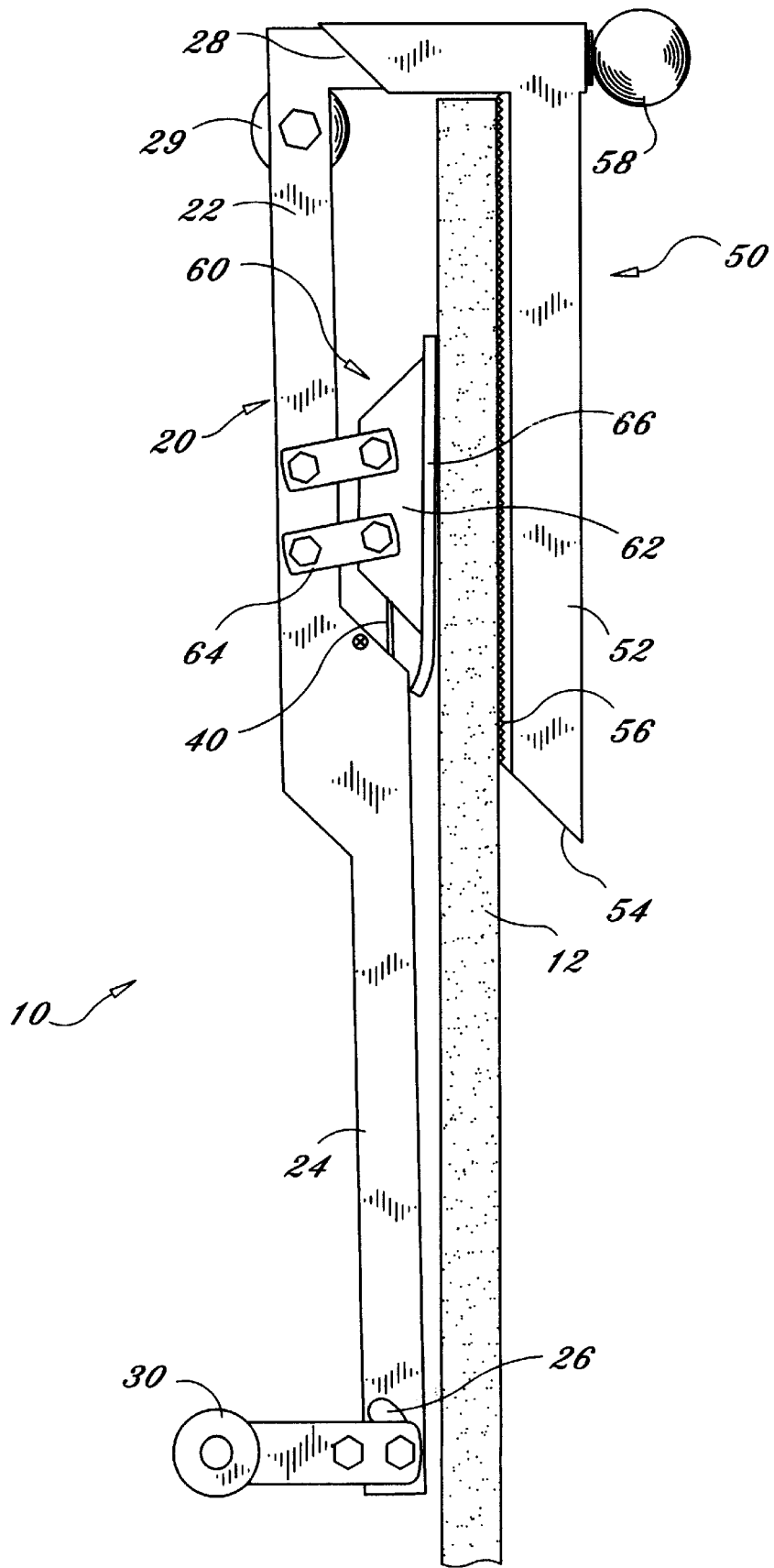
FIG. 3 is a side view of the present invention with a panel member engaged.
Figure 4:
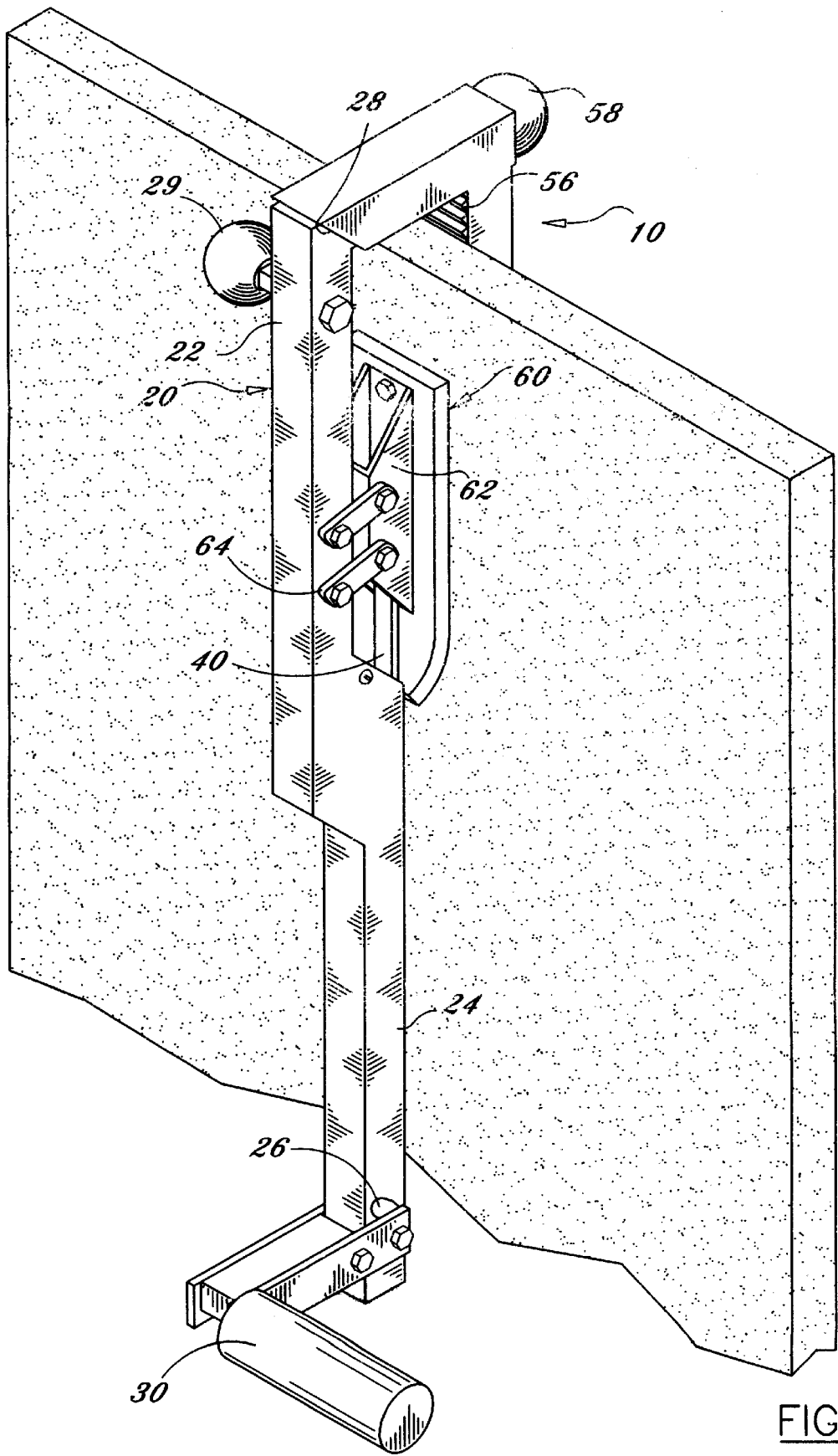
FIG. 4 is an upper perspective view of the present invention with a panel member engaged.

As best shown in FIGS. 2 and 3 of the drawings, the support member 20 is an elongated structure having a lower portion 24 and an upper portion 22. The upper portion 22 is preferably parallel to and offset from the lower portion 24. The distal end of the upper portion 22 has a traverse portion 28 that includes an interiorly threaded member 27. An upper handle 29 is preferably connected to the upper portion 22 of the support member 20.

As shown in FIGS. 1 through 4 of the drawings, the arm member 50 is slidably positioned about the traverse portion 28 of the support member 20. In an alternative embodiment the arm member 50 is permanently attached to the support member 20. The arm member 50 is comprised of an L-member 52 having a tapered end 54, and a piece of gripping 56 that faces the support member 20. The piece of gripping 56 is preferably comprised of a rubber material. The tapered end 54 is for allowing smooth positioning of the panel member carrier system 10 about the panel member 12.

As best shown in FIG. 2 of the drawings, a threaded shaft 59 rotatably extends through the L-member 52 and threadably engages the interiorly threaded member 27 of the upper portion 22. An adjusting handle 58 is attached to the threaded member 27 for allowing manual adjustment of the position of the arm member 50 with respect to the support member 20.

As shown in FIGS. 1 through 4 of the drawings, the engaging structure 60 is comprised of a face plate 66, a brace 62, and a pair of pivot members 64. The face plate 66 is preferably smooth for allowing release of the panel member 12 after engagement; however it can be appreciated by one skilled in the art that the face plate 66 may have a piece of gripping 56. The lower edge of the face plate 66 is preferably angled for easily receiving the panel member 12. A brace 62 is attached traversely to the center portion of the face plate 66. A plurality of pivot members 64 are pivotally attached to the upper portion 22 and to the brace 62 thereby maintaining the face plate 66 parallel to the gripping 56 and the L-member 52.

As shown in FIGS. 1 through 4 of the drawings, the lower handle 30 is pivotally attached to the distal end of the lower portion 24 of the support member 20. The lower portion 24 of the support member 20 includes a slot 26 for receiving a fastener attached to the end of the lower handle 30 wherein the fastener is allowed to pivot within the slot 26. A connecting member 40 is attached to the fastener of the lower handle 30 and to the brace 62 opposite thereof. A spring 42 is attached within the tubular structure of the lower portion 24 and to the connecting member 40 for pulling the connecting member 40 upwardly thereby springably maintaining the engaging structure 60 in a released position.

In use, the user first adjusts the position of the arm member 50 with respect to the engaging structure 60 depending upon the width and number of panel members 12 to be engaged and transported by rotating the adjusting handle 58 and threaded shaft 59. The user then locates the panel member 12 to be transported and positions the tapered end 54 of the arm member 50 about the upper edge of the panel member 12. The user then slides the panel member carrier system 10 upon the panel member 12 until the panel member 12 is positioned between the gripping 56 and the face plate 66. The user then lifts upon the lower handle 30 with one hand which thereby pulls the connecting member 40 downwardly. The connecting member 40 simultaneously pulls the engaging structure 60 downwardly and thereby outwardly because of the pivot members 64. The face plate 66 engages the panel member 12 thereby squeezing the panel member 12 toward the gripping 56 until the lower handle 30 is unable to pivot any further. The user then utilizes their other hand to engage the upper handle 29 and then lifts upon the lower handle 30 to lift the panel member 12 upwardly. The elevating of the lower handle 30 further increases the gripping action of the engaging structure 60 and the piece of gripping 56 so that the panel member 12 is unable to move vertically or rotationally. The user then transports the panel member 12 to the desired location. The user then lowers the panel member 12 upon the ground surface where the lower handle 30 is lowered thereby releasing the engaging structure 60 from about the panel member 12. The spring 42 brings the connecting member 40 upwardly thereby positioning the engaging structure 60 in the released position. The user then manipulates the panel member carrier system 10 upwardly away from the panel member 12 thereby allowing attachment to another panel member 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A panel member carrier system, comprising:
   a support member having an upper portion and a lower portion;
   an arm member defining a slot between said upper portion and said arm member for receiving a panel member;
   an engaging member;
   a pair of pivot members pivotally attached to said engaging member and to said upper portion of said support member;
   a lower handle pivotally attached to said lower portion of said support member; and
   a connecting rod attached between said lower handle and said engaging member for moving said engaging member downwardly as a user lifts upon said lower handle to lift a load thereby causing said pivot members to extend said engaging member with respect to said support member respectively thereby causing said engaging member to squeeze a panel member between said engaging member and said arm member.

2. The panel member carrier system of claim 1, including a spring connected between said support member and said connecting member for springably retaining said engaging member in a released position for allowing said panel member to be inserted or released.

3. The panel member carrier system of claim 1, including a piece of gripping attached to said arm member facing said engaging member.

4. The panel member carrier system of claim 3, wherein said piece of gripping is comprised of a rubber material.

5. The panel member carrier system of claim 1, wherein said arm member has a tapered distal end.

6. The panel member carrier system of claim 1, including an upper handle attached to said upper portion of said support member.

7. The panel member carrier system of claim 1, wherein said engaging member is comprised of:
   a brace; and
   a face plate attached orthogonally to said brace and parallel to said piece of gripping.

8. The panel member carrier system of claim 7, wherein said face plate has an angled lower edge.

9. A panel member carrier system, comprising:
   a support member having an upper portion and a lower portion;
   an arm member adjustably attached to said support member by an adjusting means, wherein a slot is defined between said upper portion and said arm member for receiving a panel member;
   wherein said adjusting means comprises:
      an interiorly threaded member within a traverse portion of said support member;
      a threaded shaft threadably in engagement with said interiorly threaded member and rotatable attached to said arm member; and
      an adjusting handle connected to said threaded shaft, and
   an engaging means within said upper portion of said support member for allowing a user to selectively manipulate for pressing said panel member against said arm member.

10. The panel member carrier system of claim 9, wherein said engaging means comprises:
    an engaging member;
    at least two pivot member pivotally attached to said engaging member and to said upper portion of said support member; and
    a handle means mechanically connected to said engaging member for allowing manual manipulation of said engaging member.

11. The panel member carrier system of claim 10, wherein said handle means comprises:
    a lower handle pivotally attached to said lower portion of said support member; and
    connecting member attached between said lower handle and said engaging member.

12. The panel member carrier system of claim 11, including a spring connected between said support member and said connecting member for springably retaining said engaging member in a released position for allowing said panel member to be inserted or released.

13. The panel member carrier system of claim 10, wherein said engaging member is comprised of:
    a brace; and
    a face plate attached orthogonally to said brace.

14. The panel member carrier system of claim 13, wherein said face plate has an angled lower edge.

15. The panel member carrier system of claim 9, including a piece of gripping attached to said arm member facing said engaging member.

16. The panel member carrier system of claim 9, wherein said arm member has a tapered distal end.

17. The panel member carrier system of claim 9, including an upper handle attached to said upper portion of said support member.

18. A panel member carrier system, comprising:
- a support member having an upper portion and a lower portion;
- an arm member adjustably attached to said support member by an adjusting means, wherein a slot is defined between said upper portion and said arm member for receiving a panel member;
- an engaging means within said upper portion of said support member for allowing a user to selectively manipulate for pressing said panel member against said arm member;
- wherein said engaging means comprises:
    - an engaging member;
    - at least two pivot member pivotally attached to said engaging member and to said upper portion of said support member; and
    - a handle means mechanically connected to said engaging member for allowing manual manipulation of said engaging member;
- wherein said handle means comprises:
    - a lower handle pivotally attached to said lower portion of said support member; and
    - a connecting member attached between said lower handle and said engaging member;
- a spring connected between said support member and said connecting member for springably retaining said engaging member in a released position for allowing said panel member to be inserted or released;
- a piece of gripping attached to said arm member facing said engaging member;
- wherein said arm member has a tapered distal end;
- an upper handle attached to said upper portion of said support member; and
- wherein said adjusting means comprises:
    - an interiorly threaded member within a traverse portion of said support member;
    - a threaded shaft threadably in engagement with said interiorly threaded member and rotatably attached to said arm member; and
    - an adjusting handle connected to said threaded shaft.

19. The panel member carrier system of claim 18, wherein said engaging member is comprised of:
- a brace; and
- a face plate attached orthogonally to said brace and parallel to said piece of gripping.

20. The panel member carrier system of claim 19, wherein said face plate has an angled lower edge.

* * * * *